(12) United States Patent
Miyabata et al.

(10) Patent No.: US 6,671,248 B2
(45) Date of Patent: Dec. 30, 2003

(54) APPARATUS AND METHOD OF CONTROLLING LASER POWER

(75) Inventors: Yoshiyuki Miyabata, Kyoto (JP); Toshiya Akagi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 432 days.

(21) Appl. No.: 09/859,585

(22) Filed: May 18, 2001

(65) Prior Publication Data
US 2002/0021641 A1 Feb. 21, 2002

(30) Foreign Application Priority Data
May 18, 2000 (JP) ........................................ 2000-146537

(51) Int. Cl.$^7$ ................................................. G11B 7/00
(52) U.S. Cl. ..................................... 369/116; 369/53.26
(58) Field of Search .............................. 369/116, 59.11, 369/59.12, 106, 53.26, 53.27, 23.31, 53.34, 53.37, 47.5, 47.51, 47.52; 372/30, 31, 32, 33, 34, 36, 29.015, 38.02

(56) References Cited

U.S. PATENT DOCUMENTS

| | | | | |
|---|---|---|---|---|
| 4,858,220 A | * | 8/1989 | Funada | 369/116 |
| 5,237,558 A | * | 8/1993 | Horikiri et al. | 369/53.26 |
| 5,495,463 A | * | 2/1996 | Akagi et al. | 369/116 |
| 5,625,616 A | * | 4/1997 | Koike et al. | 369/53.26 |
| 6,292,497 B1 | * | 9/2001 | Nakano | 372/29.015 |

FOREIGN PATENT DOCUMENTS

JP 11-213428 8/1999

* cited by examiner

*Primary Examiner*—Thang V. Tran
(74) *Attorney, Agent, or Firm*—Wenderoth, Lind & Ponack, L.L.P.

(57) ABSTRACT

A laser power controller detects the temperature and current setting used for the recording power during initial learning or the previous recording operation. When a new recording operation starts, the controller detects the temperature again and compared the detected temperature with the temperature at initial learning or the previous recording to adjust the current setting used for the previous recording power setting and set the initial recording power current of the new recording operation.

15 Claims, 5 Drawing Sheets

APPARATUS AND METHOD OF CONTROLLING LASER POWER

BACKGROUND OF THE INVENTION

1. Field of the Invention

The present invention relates to an apparatus and method for controlling the power of a laser emitted to an optical recording medium in order to record information to or reproduce information from an optical recording medium.

2. Description of Related Art

Optical disc drives for reading and writing information to optical storage media accomplish the reading and writing operations by emitting a laser beam to the optical disc. A digital operation is used to control the power of the laser beam emitted to the disc.

Figure 5:
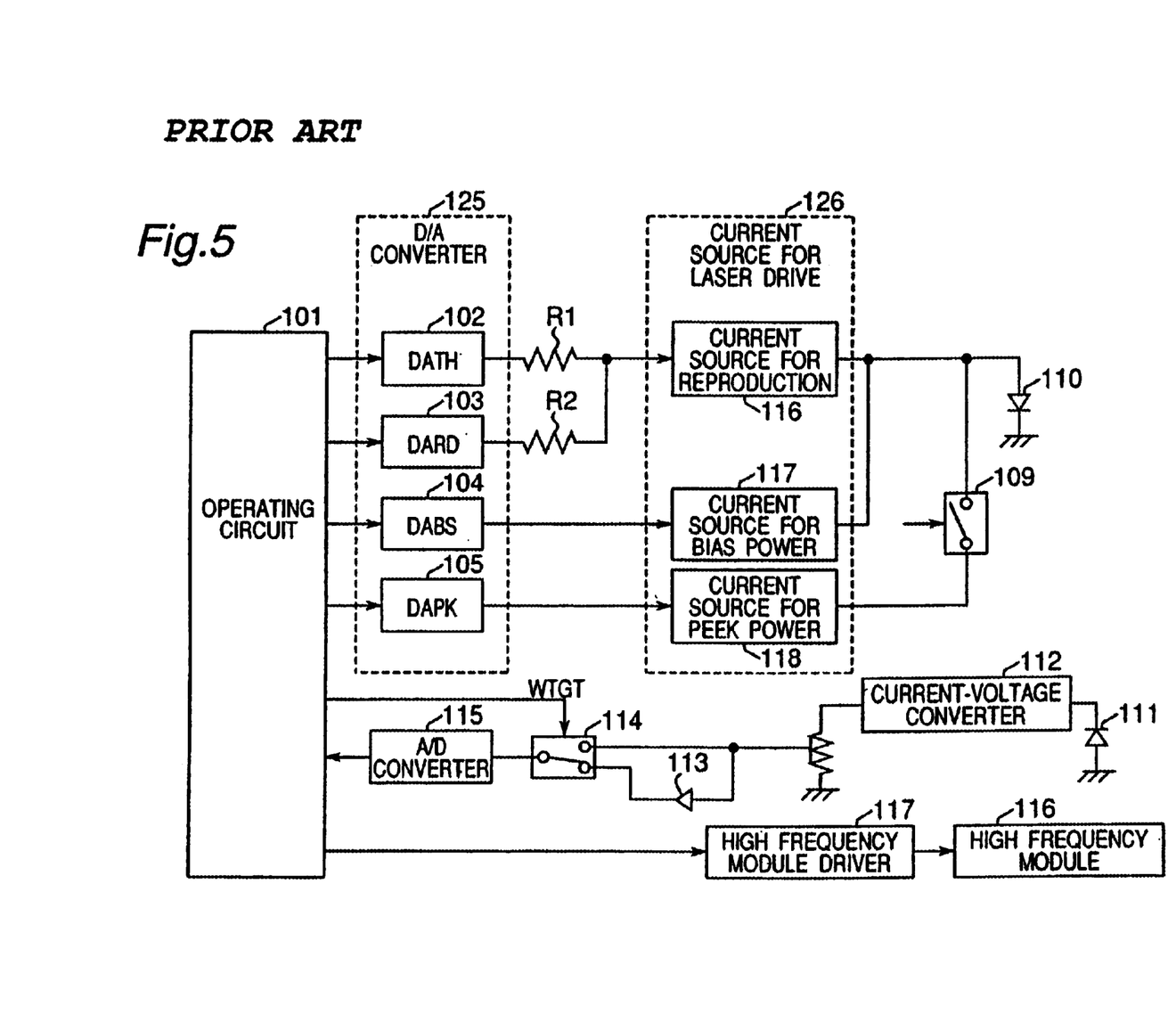
FIG. 5 shows the configuration of a typical conventional laser power control apparatus.

Laser power control in a typical optical disc drive is described next with reference to FIG. 5. FIG. 5 is a block diagram of a conventional laser power controller that controls laser power using a digital process.

As shown in FIG. 5, this laser power controller has an operating circuit 101, A/D converter 115, D/A converter 125, laser drive current source 126, and semiconductor laser 110. The laser power controller also has a semiconductor laser 111 which is a pin photodiode and monitors the power of the laser beam output from semiconductor laser 110, and a current-voltage converter 112 for converting the monitor current from pin photodiode 111 to a voltage. D/A converter 125 has a D/A converter (DABS circuit) 104 for a bias power current, and a D/A converter (DAPK circuit) 105 for a peak power current.

This laser power controller sets laser power as follows.

A recording power learning process is first conducted. Recording power is learned by the operating circuit 101 gradually increasing output to DABS circuit 104 in D/A converter 125 while controlling DABS circuit 104 so that A/D converter 115 output is adjusted to the two specific values ADBSa and ADBSb needed to achieve the bias power (erase power) level, and then obtaining the drive current values DABSa and DABSb at which ADBSa and ADBSb are achieved. These two values ADBSa and ADBSb are then set as the near upper and lower limits of the range containing the desired bias power level.

Slope Kb near bias power Pb can be obtained from the following equation.

$$Kb=(DABSb-DABSa)/(ADBSb-ADBSa)$$

Next, while DABS circuit 104 of D/A converter 125 is holding DABSb and output to DAPK circuit 105 of D/A converter 125 is gradually increased, DAPK circuit 105 of D/A converter 125 is controlled so that output of A/D converter 115 goes to the two specific values ADPKa and ADPKb needed to achieve peak power (recording power). Drive current values DAPKa and DAPKb corresponding to ADPKa and ADPKb obtained at that time are detected. These two values ADPKa and ADPKb are set as the near upper and lower limits of the range containing the desired peak power level. The slope near peak power Pp can be obtained from the following equation similar to the above bias power equation.

$$Kp=(DAPKb-DAPKa)/(ADPKb-ADPKa)$$

It is assumed that the bias power Pb and peak power Pp required for recording are A/D converter 115 output values ADBSX and ADPKX, respectively. DABSX and DAPKX output from operating circuit 101 to DABS circuit 104 and DAPK circuit 105 of D/A converter 125 to achieve bias power Pb and peak power Pp can be obtained from the following equations.

$$DABSX=Kb*(ADBSX-ADBSa)+DABSa$$

$$DAPKX=Kp*(ADPKX-ADBSX-(ADPKa-ADBSb))+DAPKa.$$

This is further described in, for example, Japanese Patent Laid-Open Publication No. 6-338073.

Problems with this control method are described next. When reproduction continues for a long time after recording is completed, the surrounding temperature changes. For a semiconductor laser, the relationship between laser power and drive current changes as the temperature changes. This means that the recording power changes when recording starts again, thus inviting deterioration in recording reliability. Therefore, recording power learning is necessary to avoid this.

On the other hand, since recording requests occur at random and the seek time needed to find a recording area tends to increase as recording volume increases, out-of-focus power learning and power learning in a separate learning area as a means of shortening the time to the start of recording also degrade disc access performance, and cannot be easily implemented.

Current output to the laser generating section at the start of recording is therefore set to the current setting of the previous recording operation, or to a current setting determined when the power turns on or as a result of an adjustment process. The current needed for driving a semiconductor laser to emit at a particular power level changes according to the temperature. The current required for the laser to output at a specific power level is therefore temperature dependent. This means that if the temperature of the semiconductor laser at the end of one recording operation differs greatly from the laser temperature at the start of a next recording operation, actual laser output power at the next recording operation may differ greatly from the required recording power.

A common means of reducing the beam spot size in conjunction with the increase in recording density has been to use only the primary beam of the light output. Thus, both semiconductor laser output power and efficiency at the pick-up power become reduced, and recording power becomes near the rated laser power. This means that the temperature dependence of semiconductor laser output may cause laser output to exceed the rated power, and thus shorten laser life.

Methods for controlling the current used to drive the semiconductor laser based on temperature data alone are also possible. In this method, however, it is also necessary to consider external factors other than temperature change, including changes in IC output resulting from power supply fluctuation and the temperature characteristics of the IC device, and it is difficult to achieve laser power control with the required precision.

The present invention is directed to the aforementioned problems, and provides a laser power control apparatus and method capable of maintaining stable recording power output during data recording even when the temperature around the semiconductor laser changes.

SUMMARY OF THE INVENTION

Laser power control according to the present invention detects the temperature difference between the previous recording operation and the present recording time, calculates the value of a drive current setting signal applied to the laser generating means when recording starts again based on the detected temperature difference, and drives the laser according to this drive current setting signal. The relationship between laser drive current and output power is then determined while detecting laser output power, and feedback control is used to adjust the drive current setting signal so that the desired recording power is obtained. This reduces abnormal laser emissions and makes it possible to control the semiconductor laser to output at a stable recording power level even when the output power tends to vary as a result of external factors other than the temperature of the ambient environment.

In the first aspect of the invention, an apparatus for controlling a laser power comprises a laser generator, a laser driver, an operating section, a temperature detector, a memory, and a current variation determination section.

The laser generator emits a laser beam with which data are recorded to or reproduced from an optical disc.

The laser driver controls emission power of the laser generator with a drive current supplied to the laser generator.

The operating section calculates at a first timing a drive current setting signal which controls the drive current supplied from the laser driver, updates the drive current setting signal, and outputs the updated drive current setting signal to the laser driver.

The temperature detector detects temperature of the laser generator.

The memory stores temperature of the laser generator at a predetermined timing and value of the drive current setting signal at the predetermined timing.

The current variation determination section determines variation rate of the value of the drive current setting signal according to a first temperature and temperature difference between the first temperature and a second temperature.

The operating section inputs temperature of the laser generator at start of recording from the temperature detector, reads out the temperature of the laser generator from the memory, obtains the variation rate with reference to the current variation determination section using the input temperature of the laser generator as the first temperature and the read temperature of the laser generator as the second temperature, and determines the value of the drive current setting signal to be used at the start of recording based on the obtained variation rate and the value of the drive current setting signal stored in the memory.

In the apparatus, the predetermined timing may be when the recording operation terminates, or when the operating section updates the drive current setting signal.

The apparatus may further comprise a power detector for detecting power emitted from the laser generator. In this case once recording operation starts, the apparatus may detect the emitted power every predetermined time by the power detector. The operating section may calculate, based on the detected power, the drive current setting signal so that the emission power is equal to a predetermined recording power.

In the apparatus, the temperature detector may detect temperature of a member through which heat of the laser generator conducts.

In the apparatus, the current variation determination section may comprise a table in which the temperature difference between the first and second temperature corresponds to the value of the drive current setting signal at the first temperature. The table may link the temperature difference with the variation rate of the value of the drive current setting signal of the laser generator at the first temperature.

Alternatively, the current variation determination section may comprise an approximate equation which provides, using high order function, relation between the first temperature, the temperature difference between the first and second temperature, and the variation rate of the value of the drive current setting signal at the first temperature.

In a second aspect of the invention, a method of controlling a laser power control apparatus is provided.

The apparatus comprises a laser generator for emitting a laser beam with which data are recorded to or reproduced from an optical disc, a laser driver for controlling emission power of the laser generator with a drive current supplied to the laser generator, a operating section for calculating at a first timing a drive current setting signal which controls the drive current supplied from the laser driver, updating the drive current setting signal, and outputting the updated drive current setting signal to the laser driver, and a current variation determination section for determining variation rate of the value of the drive current setting signal according to a first temperature and temperature difference between the first temperature and a second temperature.

The method comprises, at predetermined timing, storing temperature of the laser generator and value of the drive current setting signal. The method comprises, at start of recording after the predetermined timing, detecting temperature of the laser generator at start of recording, reading out the stored temperature of the laser generator, obtaining the variation rate from the current variation determination section using the detected temperature of the laser generator as the first temperature and the read temperature of the laser generator as the second temperature, and determining the value of the drive current setting signal to be used at the start of recording based on the obtained variation rate and the stored value of the drive current setting signal.

BRIEF DESCRIPTION OF THE DRAWINGS

These and other objects and features of the present invention will be readily understood from the following detailed description taken in conjunction with preferred embodiments thereof with reference to the accompanying drawings, in which like parts are designated by like reference numerals and in which.

DESCRIPTION OF THE PREFERRED EMBODIMENTS

A preferred embodiment of a laser power control apparatus according to the present invention is described below with reference to the accompanying drawings.

1. Configuration of a Laser Power Control Apparatus

Figure 1:
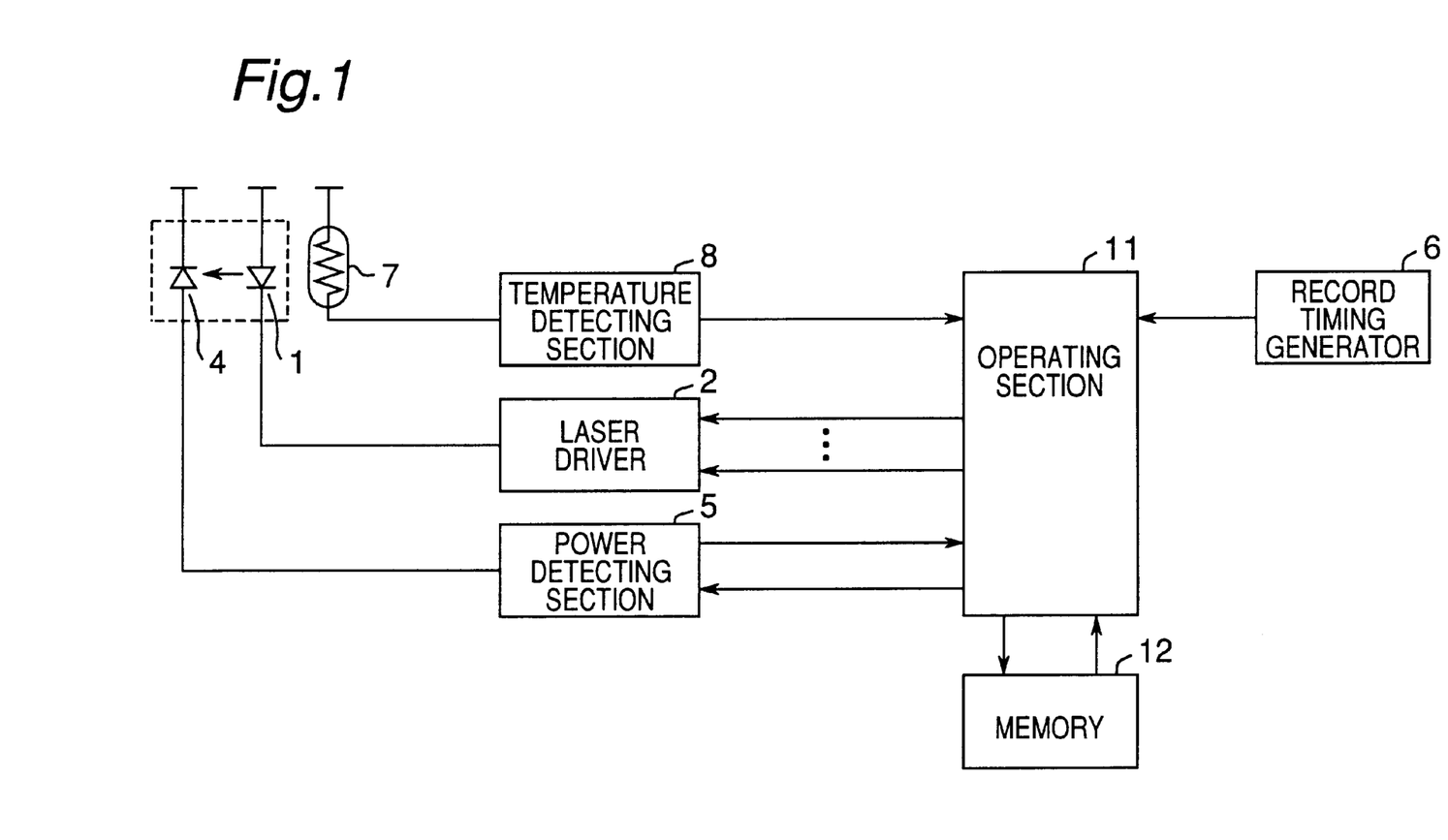
FIG. 1 is a block diagram of a laser power control apparatus according to the present invention.

FIG. 1 is a block diagram of a laser power control apparatus according to a first preferred embodiment of the present invention.

Referring to FIG. 1, a semiconductor laser 1 outputs laser beam with power amount required to reproduce data from or record data to an optical recording medium. When reading the optical recording medium, a laser driver 2 drives semiconductor laser 1 by means of high frequency superimposition to output a laser beam at the read power level determined by a laser drive current setting signal which corresponds to a desired laser output level. When recording to the optical recording medium, the laser driver 2 modulates a current which is to be fed into the semiconductor laser 1 according to the recording marks and test emission, and outputs the current. A pin photodiode 4 detects laser beam output from the semiconductor laser 1, and outputs a current value corresponding to the detected laser beam. A power detecting section 5 converts an output from the pin photodiode 4 to amount of emission power.

A thermistor 7 is disposed in proximity to the semiconductor laser 1 to detect the temperature of the semiconductor laser 1. The temperature of the semiconductor laser 1 can be detected via a member conducting heat from the semiconductor laser 1. A temperature detecting section 8 converts the output from the thermistor 7 to temperature data and outputs the converted temperature data as temperature information. A memory 12 stores this temperature data, the drive current setting signal, semiconductor laser drive current, and laser power characteristics.

A recording timing generator 6 outputs a recording gate signal indicative of a reproducing state or a recording state. An operating section 11 operates according to the recording gate signal output from the recording timing generator 6. That is, when the recording gate signal indicates the reproducing state, the operating section 11 generates a laser drive current setting signal corresponding to the reproducing power level based on the detection signal from the power detecting section 5, and outputs the setting signal to the laser driver 2. When the recording gate signal indicates the start of recording, the operating section 11 generates a laser drive current setting signal corresponding to the desired recording power level, and outputs the setting signal to laser driver 2.

The operating section 11 calculates drive current of the semiconductor laser 1 and output power characteristic from the detection signal output from the power detecting section 5. Based on these calculated values, the operating section 11 calculates and outputs a laser drive current setting signal corresponding to a desired recording power. Note that when a new drive current setting signal is calculated from this operation, the operating section 11 updates the output thereof.

When the recording gate signal indicates the end of recording, the operating section 11 stores, to the memory 12, laser drive current setting signal being output, laser drive current at the end of recording, laser power characteristics, and temperature information output from the temperature detecting section 8 at the end of recording (referred to below as the "previous temperature information").

When the recording gate signal again indicates a recording state, the operating section 11 operates as follows.

First, the operating section 11 reads the semiconductor laser temperature information detected by the temperature detecting section 8 (the "current temperature information"). Then based on the previous temperature information stored to the memory 12, the operating section 11 reads the temperature difference between temperature indicated by the previous temperature information and temperature indicated by the current temperature information, and determines changes in the laser drive current and the power characteristics. Next, by applying the changes to the laser drive current setting signal and the power characteristic which are stored in the memory 12, the operating section 11 modifies the laser drive current setting signal stored in the memory 12 to output the signal to the laser driver 2. Then the operating section 11 detects, by the power detecting section 5, again laser power which is output according to this new laser drive current setting signal, determines the laser drive current setting signal corresponding to the desired recording power, and power characteristic of the semiconductor laser 1 which indicates relation between drive current and power of the laser 1, and outputs them to the laser driver 2.

2. Operation of Laser Power Control Apparatus

Operation of the above laser power control apparatus is described next below.

Operation of Each Part of the Apparatus

The initial recording power of the semiconductor laser 1 is set when the optical disc drive starts up, the power is turned on, or a disc is inserted. To accomplish this, the operating section 11 sequentially sets the drive current setting signal applied to the laser driver 2 so that the power of the semiconductor laser 1 increases, and sequentially outputs the setting signal to the laser driver 2. The laser driver 2 increases the drive current to the semiconductor laser 1 according to this setting signal.

As the laser drive current output from laser driver 2 increases, the power of the laser beam emitted from the semiconductor laser 1 also increases. The power detecting section 5 receives a current which is increased according to the emission power of the laser 1 from the pin photodiode 4, and then outputs a detection signal according to the emission power to the operating section 11. The operating section 11 determines the relationship between current output to the laser and the emission power of the semiconductor laser 1, determines the laser drive current setting signal corresponding to the desired recording power, and updates the value of this signal accordingly.

Immediately after completing the recording power setting process in the initial state, the operating section 11 obtains temperature information output from the temperature detecting section 8, and stores to memory 12 the laser drive current setting signal (corresponding to the recording power) in the initial state, characteristic ("slope efficiency" below) between the current and the output power of the laser in the initial state, and the temperature data in the initial state. When the recording gate signal output from the recording timing generator 6 indicates the start of recording, the operating section 11 obtains the temperature information at the start of recording from the temperature detecting section 8.

Based on the initial temperature information stored in the memory 12, and the difference between the temperature in the initial state and the temperature at the start of recording, the operating section 11 determines "islope variation rate" as a modification amount of the slope efficiency in the initial state. The operating section 11 then calculates the laser drive current setting signal from the initial laser drive current setting signal stored in the memory 12, the initial slope efficiency, and the slope variation rate, and outputs the calculated setting signal to the laser driver 2.

The operating section 11 also obtains from power detecting section 5 a detection signal indicative of the emission power of the semiconductor laser that is emitted according to the laser drive current setting signal from the laser driver 2, determines a laser drive current setting signal and slope efficiency, calculates a laser drive current setting signal corresponding to the desired recording power, and outputs the calculated signal to the laser driver 2, then starting recording data.

While the recording gate signal output from the recording timing generator 6 indicates a recording state, the operating section 11 obtains from the power detecting section 5 a detection signal corresponding to the emission power of the semiconductor laser 1, which emits according to the laser drive current setting signal from the laser driver 2, determines the laser drive current setting signal and slope efficiency, and calculates a laser drive current setting signal for the desired recording power, and outputs the calculated signal to the laser driver 2. The operating section 11 continues repeating this recording power control loop.

When the recording gate signal then changes from the recording state to a reproducing state, the operating section 11 obtains the temperature information immediately after recording ends. The operating section 11 then stores to the memory 12 the laser drive current setting signal at the end of recording, and the slope efficiency, together with the obtained temperature.

When the gate signal again changes from the reproducing state to a recording state, the operating section 11 obtains the temperature information immediately before the start of recording from the temperature detecting section 8, and determines the slope variation rate from the temperature stored in the memory 12 at the previous end of recording and the difference temperature information. The difference temperature information indicates difference of temperature between the temperature stored in the memory 12 at the previous end of recording and the temperature at the start of recording. The operating section 11 then again determines the laser drive current setting signal based on the laser drive current setting signal stored in the memory 12, the slope efficiency, and the determined slope variation rate, and applies this laser drive current setting signal to the laser driver 2 again as the laser drive current setting signal which is to be used at the start of recording.

The operating section 11 also detects the emission power of the semiconductor laser 1 which is emitted according to this reset laser drive current setting signal by the power detecting section 5 as emission power for recording, again determines the slope efficiency from the laser drive current setting signal and the detected emission power, calculates the optimal laser drive current setting signal for the desired recording power, and outputs the optimal laser drive current setting signal to the laser driver 2.

By performing the above operation each time recording starts, the current required to drive the semiconductor laser 1 can be changed according to the temperature, and the semiconductor laser 1 can be prevented from emitting at an abnormally high level immediately after the start of recording even when the recording interval is long. Furthermore, because the slope variation rate is determined at the initial recording operation, adjustment to the recording power can be accomplished quickly without the laser output power becoming excessively high.

The power detecting section 5 can be achieved by converting the current of the pin photodiode detecting a part of the laser emission power to a voltage, and outputting information about the emission power and the voltage. The recording power can be detected by using, for example, a peak detection circuit or a bottom detection circuit, A/D converting the detected value, and outputting the resulting digital signal.

The temperature detecting section 8 can be implemented by means which obtains the temperature information by converting voltage using the change in the resistance of the thermistor 7, and then outputs the value which is A/D converted, or samples and holds the value.

It will also be noted that a thermocouple or other detection device from which temperature information can be obtained can be used in place of thermistor 7. The thermistor 7 or other detector is also preferably located where it can directly measure the heat of semiconductor laser 1, such as on the laser housing. The temperature detecting means can, however, comprise means to detect the ambient temperature inside the pickup, or to detect the temperature of the laser indirectly through a medium conducting the heat of the laser.

The laser driver 2 can be achieved by means to turn the current output to the laser on and off with a switch according to the recording signal waveform. This switch can be a transistor switch, for example.

The operating section 11 can be achieved by means of a digital signal processor (DSP) or CPU that A/D converts and captures data from the power detecting section 5, determines the value output to the laser by using the current value output to a current output means and information from the power detecting section 5, and re-calculates the current setting signal.

By operating as described above, it is possible to detect the temperature difference when recording, re-calculate from this temperature difference the initial current setting of the laser output when recording starts, and thus prevent the abnormally high laser output.

Overall Operation of Laser Power Control Apparatus

The overall operation of the laser power control apparatus according to this preferred embodiment of the invention is described next.

Figure 2:
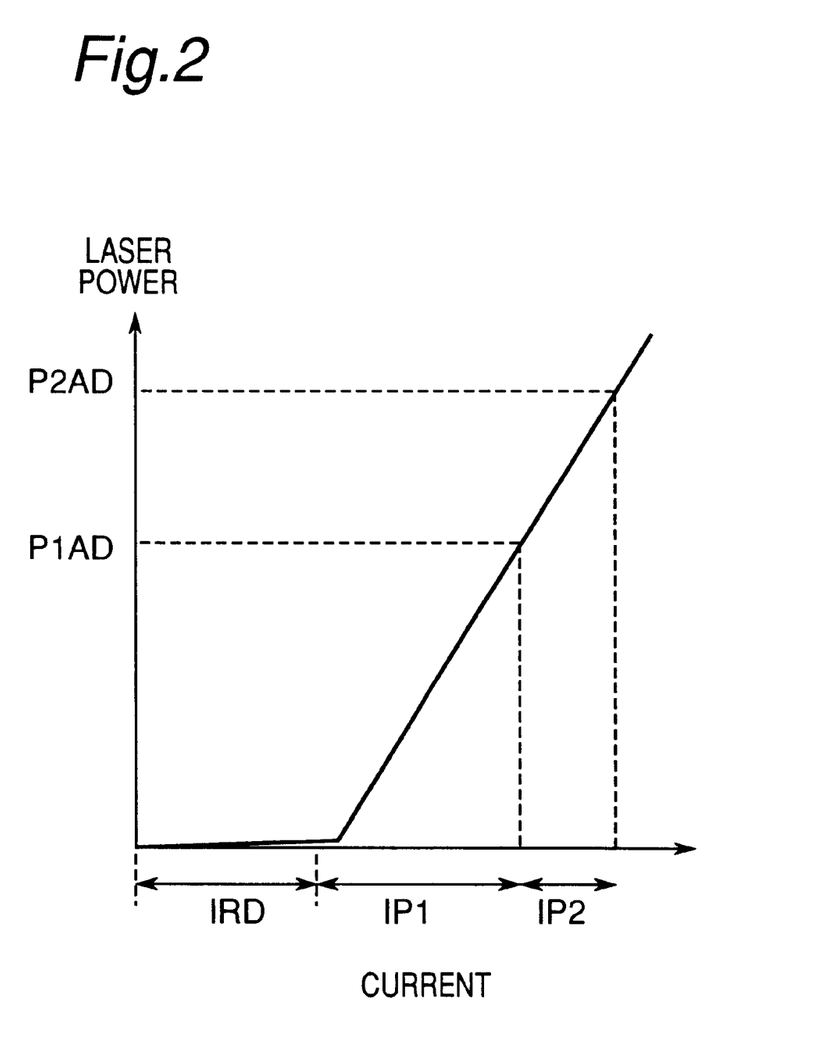
FIG. 2 shows the relationship between laser power and drive current for describing operation of the laser power control apparatus shown in FIG. 1.
Figure 3A:
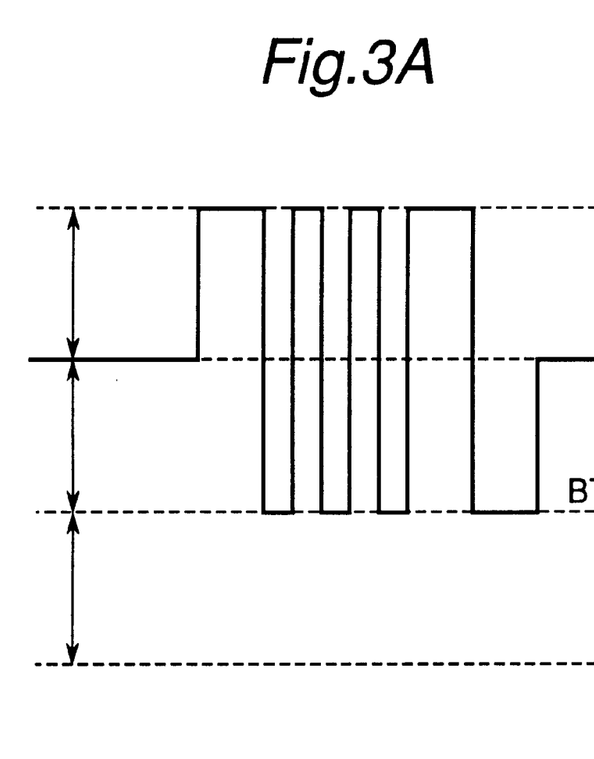
FIG. 3A shows a drive current waveform during recording.
Figure 3B:
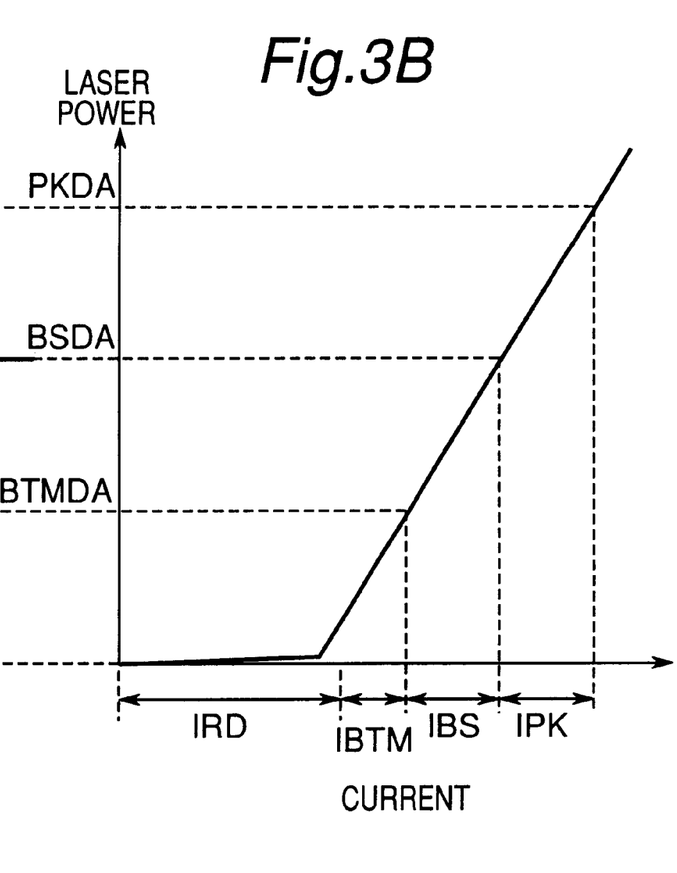
FIG. 3B shows the relationship between laser power and drive current for setting the recording laser power.

FIG. 2 shows the relationship between the emission power of the semiconductor laser 1 and the drive current applied to the semiconductor laser 1. FIG. 3B shows the relationship between laser power and current when setting the recording power. FIG. 3A shows the typical recording waveform at that time. In FIG. 3, PKDA is the peak power used when recording data, BSDA is the bias power used for erasing data, and BTMDA is the bottom power used for example to cool the optical recording medium.

Reproduction control is first performed while a known process for focusing on the disc is not applied, such as when the drive starts up, power is turned on, or a disc is inserted. The operating section 11 outputs the laser drive current setting signal to the laser driver 2. The pin photodiode 4 detects amount of the emission power of the semiconductor laser 1, and outputs a current proportional to the detected power amount to the power detecting section 5.

The power detecting section 5 outputs a voltage corresponding to the emission power of the semiconductor laser 1 to the operating section 11. The operating section 11 compares the power detected by the power detecting section 5 and target reproducing power (RDAD (for example, 1.0 mW)), and controls the laser drive current setting signal so that the laser emission power becomes equivalent to the target reproducing power (RDAD). A threshold current of the semiconductor laser 1 is also controlled at this time. When the laser power is detected to be at a specific power level, reproducing control stops, updating the laser drive current setting signal is interrupted, and the laser drive current is held. Value of the held drive current is referred to as "IRD".

The operating section 11 then gradually increases the laser drive current setting signal by a specific increment (such as by 1 LSB units) to obtain the laser drive current at which laser emission power reaches a power level (P1AD, equivalent to 5 mW, for example) near the actual usable recording power. The operating section 11 then continues increasing the laser drive current to obtain the laser drive current (IP2) at which the output recording power P2AD (such as 10 mW) is achieved, and an equation for the value (the slope efficiency below) indicating the relationship between current and laser output power during recording is calculated. Slope efficiency η0 is obtained from the following equation.

$$\eta 0 = (IP2)/(P2AD - P1AD)$$

Laser drive current IPK0, IBS0, and IBTM0 are obtained from the following equations based on slope efficiency η0. Laser drive current IPK0, IBS0, and IBTM0 are required to obtain peak power PKAD (13 mW, for example), bias power BSAD (6 mW), and bottom power BTMAD (1 mW) shown in FIG. 3.

$$IPK0 = \eta 0 * (PKAD - BSAD)$$

$$IBS0 = \eta 0 * (BSAD - BTMAD)$$

$$IBTM0 = IP1 - \eta 0 * (P1AD - BTMAD)$$

Calculating current IBTM0 differs from the other two current calculations because there is no current with a superimposed high frequency component during recording, and the actual power emission contains a threshold current component. The resulting laser drive current settings IPK0, IBS0, and IBTM0, and slope efficiency η0 are then stored to the memory 12.

The operating section 11 obtains the temperature information from the thermistor 7 for detecting the temperature of the semiconductor laser 1, via the temperature detecting section 8, and stores the temperature information to the memory 12. The temperature information thus obtained at this time is T0.

Operation when recording then starts is described below.

The operating section 11 obtains temperature T1 at the start of recording from the temperature detecting section 8 according to the recording gate signal, reads the previous temperature T0 stored in the memory 12, and determines slope variation rate α required for the laser emission dependent on the temperature from the difference (T0–T1) between previous temperature T0 and the current temperature T1. Based on this slope variation rate α and using the drive current setting signal from the previous recording operation stored in the memory 12, the operating section 11 calculates the laser drive current setting signal again, and updates output to the calculated value. A method of calculating the slope variation rate α is described in detail later. Each current value IPK1, IBS1 or IBTM1 is obtained from the following equations.

$$IPK1 = \alpha * \eta 0 * (PKAD - BSAD) = \alpha * IPK0$$

$$IBS1 = \alpha * \eta 0 * (BSAD - BTMAD) = \alpha * IBS0$$

$$IBTM1 = IP1 - \alpha * \eta 0 * (P1AD - BTMAD)$$
$$= IBTM0 - \alpha * \eta 0 * BTMAD$$

These current values are output to the laser driver 2 as the laser drive current setting signal for the start of recording.

The operating section 11 outputs a laser drive current corresponding to the laser drive current setting signal calculated as described above to the laser driver 2.

The power detecting section 5 then detects the amount of the power of the semiconductor laser 1 to output the detected result to the operating section 11. Based on the detected result, the operating section 11 controls the value of the laser drive current setting signal so that the emission power of the laser is equal to the set recording power, at a specific time interval (an interval at which the temperature-induced slope change is not drastic, for example, at each sector of a DVD-RAM disc). The operating section 11 thus detects the emission power of the semiconductor laser 1 in a feedback control loop to continually regulate the recording power while recording continues.

A new laser slope efficiency (η1) can be obtained from the following equation, where PKAD1, BSAD1, and BTMAD1 are the laser output power values detected by power detecting section 5 in this feedback control loop.

$$n1 = (IPK1)/(PKAD1 - BSAD1)$$

When PKAD2 (13 mW, for example) is the target recording power, BSAD2 (6 mW) is the target erasing power, and BTMAD2 (1 mW) is the target bottom power, each laser drive current setting signal IPK2, IBS2, or IBTM2 for each target power can be obtained from the following equations.

$$IPK2 = \eta 1 * (PKAD2 - BSAD1)$$

$$IBS2 = \eta 1 * (BSAD2 - BTMAD1)$$

$$IBTM2 = IBTM1 - \eta 1 * (BTMAD2 - BTMAD1)$$

Recording power can be set using these current values.

When recording thus starts and continues for a period of time, a laser drive current setting signal for the target recording power is output to the laser driver 2, power detecting section 5 detects the recording power at a specific regular time interval. Then the slope efficiency is obtained from the detected recording power. The value of the laser drive current setting signal for the target recording power is recalculated from these values, and the signal is updated.

Operation when the recording gate signal indicates the end of recording is described next.

The operating section 11 stores temperature information at the end of recording to the memory 12 as temperature information T0. The operating section 11 also stores the laser drive current setting signal at the end of recording and the slope efficiency (that is, the relationship between laser drive current and emission power) to the memory 12. When recording starts again, the same process as described above repeats. It will also be obvious that updating the memory 12 shall not be limited to the end of recording, but the operating section 11 can store the temperature, laser drive current setting signal, and slope efficiency to memory 12 whenever the operating section 11 updates the laser drive current setting signal.

It should be noted that slope variation rate α only needs to be calculated at the start of recording, but does not need to be repeatedly calculated during continuous recording, and thus process time can be reduced.

Furthermore, the initial output power of the semiconductor laser 1 at the start of recording will not become so abnormally great as to degrade laser performance even if the temperature changes. The present invention is therefore beneficial with respect to the durability of semiconductor laser 1. Moreover, because operating section 11 applies feedback control to detect the output power of semiconductor laser 1 and adjust the laser drive current setting signal to obtain the desired recording power, laser output can be updated to the desired recording power without the laser outputting at an abnormally high level, and highly reliable control can be achieved.

Setting Slope Variation Rate α

A method for setting the slope variation rate α is described below.

Figure 4:
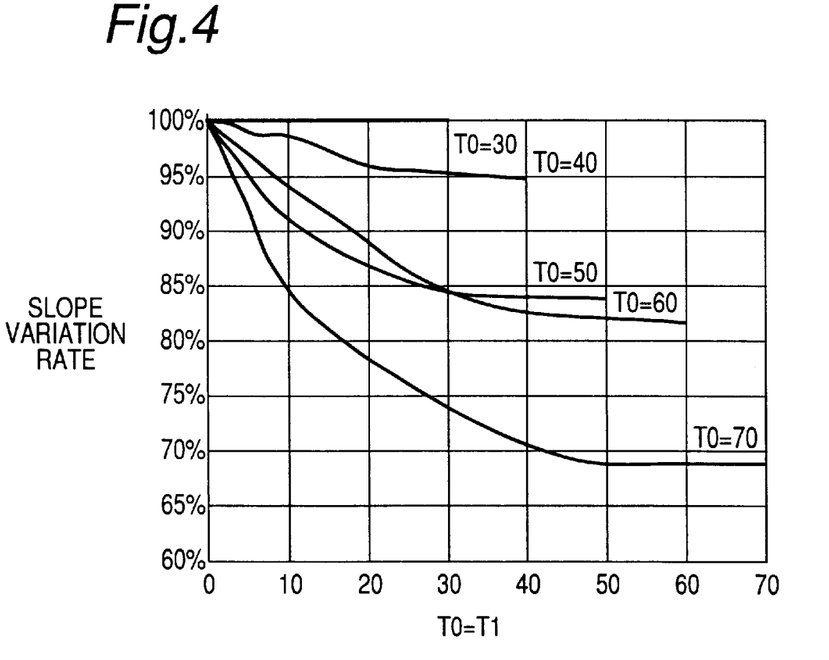
FIG. 4 shows the change in the slope (attenuation rate) to the temperature difference at specific temperature levels in the laser power control apparatus shown in FIG. 1.

FIG. 4 is a graph showing the relationship between the difference in laser temperature during recording and the variation (attenuation rate) α which is set at the respective difference for each of plural temperatures of the semiconductor laser 1. Note that the temperature difference as used herein is the difference (T0–T1) between the temperature (initial temperature) T0 at the end of the previous recording operation and the temperature T1 at the start of recording. As will be known from the figure, when the initial temperature T0 is, for example, 60 or 70° C., the variation (attenuation rate) α changes greatly to the change in the temperature difference in the range where the temperature difference (T0–T1) is small. Using such information relating to the temperature difference between the initial temperature and the temperature at the start of recording allows temperature dependent characteristic of the slope variation rate for the laser to be known, and makes it possible to update a current to be output to the laser when temperature changes. Thus, it is possible to update the power with a desired power without abnormal emission.

When T0=70° C. and (T0–T1) is greater than 10° C., the variation α in slope efficiency by the operating section 11 is determined by a quadric approximation such as shown below.

$$\text{variation}\,\alpha = 0.00007*(T0-T1)^2 - 0.0079*(T0-T1) + 0.9149$$

A quadric approximation equation can be similarly obtained for a variety of temperatures T0. Approximation is also not limited t0 a quadric equation such as above, and a polynomial equation of degree $n(n \geq 3)$ (high order function) could be used. Because such a high order approximation will require a massive number of calculations, calculation tables can be used instead of the equation. Table 1 is an example of the calculation table showing the slope variation rate.

power will be too high. The table is therefore compiled so that laser output power does not exceed the rated power. Calculation time can be shortened by using a table such as shown in Table 1 to calculate the required drive current for the semiconductor laser 1. Column A in Table 1 is the temperature history, and columns B to G show the slope variation rate for a particular change in temperature at each historical temperature range.

It was found that the semiconductor laser 1 requires more current as the temperature rises, and when the temperature is high the slope variation rate is great even if the temperature difference is small. It is therefore preferable to set the temperature difference fine when the temperature is high. Here when the temperature difference is 5 to 10 degrees, slope variation rate α is therefore set as shown in column B. This is attributed to the effect of heat generated by the semiconductor laser 1. The slope variation rate α was determined in this example by using plural semiconductor lasers of the same type and obtaining the average laser power and current change resulting from a change in temperature.

It was also found that the slope variation rate α dependent on temperature can be preferably determined by a quadratic curve approximation. While there are differences resulting from the characteristics of the semiconductor laser 1, the change in current requirements at a particular temperature difference is not uniform and can be attributed to an increase in current requirements resulting from heat generated by the laser. As already described above, the relationship between temperature and the slope variation rate α was determined by a quadratic curve approximation and compiled in a table. Approximation based on a high order function could be used to more closely match laser characteristics, but increases table size and operation process. The table was therefore compiled using a quadratic curve approximation. It should be noted that straight line approximation or polygonal line approximation can also be effectively used to shorten operating time and simplify current setting.

Table 2 shows an example of calculation result of laser emission power obtained at operating section 11 using the table 1. Table 2 shows the result when the previous tem-

TABLE 1

| | | Temperature Difference | | | | | |
|---|---|---|---|---|---|---|---|
| | A | B<br>5~10° C. | C<br>11~20° C. | D<br>21~30° C. | E<br>31~40° C. | F<br>41~50° C. | G<br>51° C. or more |
| Temperature at Previous Recording | 60° C. or more | 84% | 78% | 74% | 71% | 69% | 69% |
| | 50~59° C. | 94% | 88% | 85% | 82% | 82% | 82% |
| | 40~49° C. | 91% | 87% | 85% | 84% | 84% | 84% |
| | 30~39° C. | 98% | 96% | 95% | 95% | 95% | 95% |
| | 20~29° C. | 100% | 100% | 100% | 100% | 100% | 100% |
| | 10~19° C. | 100% | 100% | 100% | 100% | 100% | 100% |
| | 0~9° C. | 100% | 100% | 100% | 100% | 100% | 100% |

The data in Table 1 is compiled based on the relationship between temperature difference and slope variation rate α shown in FIG. 4. The table is compiled to be used when the temperature of the current recording is lower than the temperature of the previous recording. That is, the table anticipates that the previous recording was accomplished at a high temperature and the current recording starts at a low temperature. The current required for the semiconductor laser 1 to output at a specific recording power increases as the temperature rises. Therefore, if the same current applied at a high temperature is applied at a low temperature, output perature in the temperature history data is 60 degrees and the recording power is set to 13 mW. Column A shows the temperature immediately before recording starts. column B shows the relationship [mW/mA] between laser power and current at each temperature. Column C shows the overall current required for peak power output, which is obtained by using the table. Column D shows the expected output power when the table is not referenced, that is, when the current value set at a temperature of 60 degrees is used. Column E shows the peak power value when recording power is controlled by referencing the table.

TABLE 2

| A Temperature [° C.] | B Slope Rate [mw/mA] | C Setting Current [mA] | D Emission Power at Current for 60° C. [mW] | E Emission Power with the Table [mW] |
|---|---|---|---|---|
| 0 | 0.195 | 66.7 | 16.4 | 11.2 |
| 10 | 0.195 | 66.7 | 16.4 | 11.2 |
| 20 | 0.192 | 67.7 | 16.1 | 11.4 |
| 25 | 0.188 | 69.1 | 15.8 | 11.6 |
| 30 | 0.188 | 69.1 | 15.8 | 11.6 |
| 40 | 0.188 | 69.1 | 15.8 | 12.4 |
| 50 | 0.169 | 76.9 | 14.2 | 12.0 |
| 60 | 0.155 | 83.9 | 13.0 | 13.0 |

The semiconductor laser 1 used in this case has a maximum rated output of 15 mW. When the temperature changes from 60 degrees to 40 degrees and recording starts at the previous current setting without applying the power control method of the present invention, the laser output power is obtained from Table 2 to be 15.8 mW. This power exceeds the maximum rated output of 15 mW, and can potentially damage the laser. However, when the current value is adjusted by the operating section 11, output power drops to 12.4 mW, does not exceed the maximum rated output, and therefore will not damage the semiconductor laser 1.

While the power setting in Table 2 at 60 degrees is 13 mW and the output power is near 13 mW as the recording temperature drops, it is not 13 mW. This is because of the variation introduced by using the average of the results obtained with plural lasers of the same type. If the characteristics of the laser used in each drive are known, those characteristics can be used effectively for power control. Not knowing the specific characteristics of the laser is not problem for the present invention even if the initial output power is low, because the applied current is immediately recalculated. Typical values for the same type of laser, or average values determined for each production lot, can therefore be used.

When used as the initial power setting for continuous recording without recording by sector, the laser may emits with deviation from the rated output because it takes some time for emission power to attain to a convergence power. The invention therefore may be effective to this problem. The recording power convergence time can also be shortened.

It should also be noted that temperature difference divisions are set every 10 degrees in this embodiment as shown in Table 1 with the change in output power set for each division, but output power can be controlled using smaller divisions such as every 5 degrees. This enables output power to be effectively adjusted according to smaller changes in temperature. In this case it is further preferable to narrow the width of the temperature difference divisions as the temperature of the semiconductor laser 1 during the previous recording operation rises. This is because the slope variation rate $\alpha$ relative to the temperature difference (T0–T1) changes sharply as the temperature T0 of the previous recording rises. By therefore narrowing the width of the divisions used for determining the slope variation rate $\alpha$ according to the temperature T0 of the previous recording, the slope variation rate $\alpha$ can be set more precisely and an appropriate rate of the slope $\alpha$ can be determined.

It should also be noted that instead of using tables the adjustment can be determined using an approximation equation showing the relationship between the current change and semiconductor laser power due to temperature difference.

Furthermore, the present embodiment has been described with reference to the test results in which the temperature of the semiconductor laser 1 changes from high temperature to low temperature, but it will also be obvious that the present invention can effectively reset the current required for a specific recording power from low temperature to high temperature.

The method of the present invention is also effective using slope variation rate determined by linear approximation according to the temperature difference.

It should also be noted that while the present embodiment changes all recording power current settings, it is also possible to change only the recording power current so that the output power does not result in abnormal emission.

A laser power control apparatus and method according to the present invention change the laser drive current setting signal to be used for recording, according to the temperature differential between the temperature when recording ends and the temperature when recording starts. It is thereby possible to control laser output not to exceed the rated output power of the laser generator, and thus prevent deterioration of the laser generator.

Power output is also detected, and the slope variation rate (or slope efficiency) and drive current setting signal of the laser generator are obtained from the detected power to set the laser drive current setting signal for the desired recording power. Stable, highly reliable laser power control can thus be achieved.

What is claimed is:

1. An apparatus for controlling a laser power, comprising:
    a laser generator for emitting a laser beam with which data are recorded to or reproduced from an optical disc;
    a laser driver for controlling emission power of the laser generator with a drive current supplied to the laser generator;
    a operating section for calculating at a first timing a drive current setting signal which controls the drive current supplied from the laser driver, updating the drive current setting signal, and outputting the updated drive current setting signal to the laser driver;
    a temperature detector for detecting temperature of the laser generator;
    a memory for storing temperature of the laser generator at a predetermined timing and value of the drive current setting signal at the predetermined timing; and
    a current variation determination section for determining variation rate of the value of the drive current setting signal according to a first temperature and temperature difference between the first temperature and a second temperature,
    wherein the operating section inputs temperature of the laser generator at start of recording from the temperature detector, reads out the temperature of the laser generator from the memory, obtains the variation rate with reference to the current variation determination section using the input temperature of the laser generator as the first temperature and the read temperature of the laser generator as the second temperature, and determines the value of the drive current setting signal to be used at the start of recording based on the obtained variation rate and the value of the drive current setting signal stored in the memory.

2. The apparatus according to claim 1, wherein the predetermined timing is when the recording operation terminates.

3. The apparatus according to claim 1, wherein the predetermined timing is when the operating section updates the drive current setting signal.

4. The apparatus according to claim 1, further comprising a power detector for detecting power emitted from the laser generator,
   wherein once recording operation starts, detecting the emitted power every predetermined time by the power detector, the operating section calculates, based on the detected power, the drive current setting signal so that the emission power is equal to a predetermined recording power.

5. The apparatus according to claim 1, wherein the temperature detector detects temperature of a member through which heat of the laser generator conducts.

6. The apparatus according to claim 1, wherein the current variation determination section comprises a table in which the temperature difference between the first and second temperature corresponds to the value of the drive current setting signal at the first temperature.

7. The apparatus according to claim 6, wherein the table links the temperature difference with the variation rate of the value of the drive current setting signal of the laser generator at the first temperature.

8. The apparatus according to claim 1, wherein the current variation determination section comprises an approximate equation which provides, using high order function, relation between the first temperature, the temperature difference between the first and second temperature, and the variation rate of the value of the drive current setting signal at the first temperature.

9. A method of controlling a laser power control apparatus, the apparatus comprising
   a laser generator for emitting a laser beam with which data are recorded to or reproduced from an optical disc,
   a laser driver for controlling emission power of the laser generator with a drive current supplied to the laser generator,
   a operating section for calculating at a first timing a drive current setting signal which controls the drive current supplied from the laser driver, updating the drive current setting signal, and outputting the updated drive current setting signal to the laser driver, and
   a current variation determination section for determining variation rate of the value of the drive current setting signal according to a first temperature and temperature difference between the first temperature and a second temperature, wherein the method comprises:

a) at predetermined timing,
      storing temperature of the laser generator and value of the drive current setting signal;
   b) at start of recording after the predetermined timing,
      detecting temperature of the laser generator at start of recording,
      reading out the stored temperature of the laser generator;
      obtaining the variation rate from the current variation determination section using the detected temperature of the laser generator as the first temperature and the read temperature of the laser generator as the second temperature; and
      determining the value of the drive current setting signal to be used at the start of recording based on the obtained variation rate and the stored value of the drive current setting signal.

10. The method according to claim 9, wherein the predetermined timing is when the recording operation terminates.

11. The method according to claim 9, wherein the predetermined timing is when the operating section updates the drive current setting signal.

12. The method according to claim 9, further comprising, once recording operation starts,
   detecting the emitted power every predetermined time by the power detector, and
   calculating, based on the detected power, the drive current setting signal so that the emission power is equal to a predetermined recording power.

13. The method according to claim 9, wherein the current variation determination section comprises a table in which the temperature difference between the first and second temperature corresponds to the value of the drive current setting signal at the first temperature.

14. The method according to claim 13, wherein the table links the temperature difference with the variation rate of the value of the drive current setting signal of the laser generator at the first temperature.

15. The method according to claim 9, wherein the current variation determination section comprises an approximate equation which provides, using high order function, relation between the first temperature, the temperature difference between the first and second temperature, and the variation rate of the value of the drive current setting signal at the first temperature.

* * * * *